US012152353B2

(12) United States Patent
Yeh et al.

(10) Patent No.: US 12,152,353 B2
(45) Date of Patent: Nov. 26, 2024

(54) ENERGY-SAVING AND GAS-EFFICIENT PNEUMATIC BARRIER GATE DEVICE

(71) Applicants: Ching-Hsiu Yeh, Taichung (TW); Chia-Hao Yeh, Taichung (TW); Chia-Chi Yeh, Taichung (TW); Hsing-Chi Yeh, Taichung (TW); Yuan-Cheng Yeh, Taichung (TW)

(72) Inventors: Ching-Hsiu Yeh, Taichung (TW); Chia-Hao Yeh, Taichung (TW); Chia-Chi Yeh, Taichung (TW); Hsing-Chi Yeh, Taichung (TW); Yuan-Cheng Yeh, Taichung (TW)

( * ) Notice: Subject to any disclaimer, the term of this patent is extended or adjusted under 35 U.S.C. 154(b) by 0 days.

(21) Appl. No.: 18/208,319

(22) Filed: Jun. 12, 2023

(65) Prior Publication Data

US 2024/0018732 A1 Jan. 18, 2024

Related U.S. Application Data

(63) Continuation-in-part of application No. 17/864,423, filed on Jul. 14, 2022.

(51) Int. Cl.

| | |
|---|---|
| ***E01F 13/06*** | (2006.01) |
| ***F15B 15/06*** | (2006.01) |
| ***F15B 15/14*** | (2006.01) |
| ***F15B 15/22*** | (2006.01) |
| ***F15B 15/28*** | (2006.01) |

(52) U.S. Cl.

CPC .............. *E01F 13/06* (2013.01); *F15B 15/06* (2013.01); *F15B 15/1404* (2013.01); *F15B 15/1428* (2013.01); *F15B 15/149* (2013.01); *F15B 15/226* (2013.01); *F15B 15/2807* (2013.01)

(58) Field of Classification Search

CPC ......... E01F 13/04; E01F 13/06; E01F 13/065; E01F 9/669; F15B 11/06; F15B 21/048

See application file for complete search history.

(56) References Cited

U.S. PATENT DOCUMENTS 3,943,972 A * 3/1976 Bitonti .................. F15B 11/064 137/596.17
3,975,861 A * 8/1976 Baump ................... E01F 13/06 49/28

(Continued)

FOREIGN PATENT DOCUMENTS

JP 2008025293 A * 2/2008
WO WO-9518266 A1 * 7/1995 .............. E01F 13/06

*Primary Examiner* — Thomas E Lazo

(57) ABSTRACT

An energy-saving pneumatic barrier gate device comprises a machine, having an actuating portion, an electronic control portion, and a gas supply portion connected to an air compressor; a shaft assembly and two switch components, installed on the actuating portion; a barrier component, installed on one end of the shaft assembly; and a driving assembly, installed on the other end of the shaft assembly. The shaft assembly controls execution of swinging of the barrier component. The two switch components control cessation of swinging of the barrier component. The driving assembly controls the movement of the shaft assembly and barrier component, and includes a linkage rod pivoted to the shaft assembly and two bellow pumps each having one end pivoted to a respective one of two ends of the linkage rod and the other end installed on a respective one of supports on an outer surface of the gas supply portion.

9 Claims, 7 Drawing Sheets

(56) References Cited

U.S. PATENT DOCUMENTS

| | | | | | |
|---|---|---|---|---|---|
| 4,391,568 | A * | 7/1983 | Tenney | F04B 41/04 | 165/125 |
| 4,486,917 | A * | 12/1984 | Johnston | E05F 3/02 | 16/337 |
| 4,638,597 | A * | 1/1987 | Lybecker | E06B 11/02 | 49/357 |
| 4,658,543 | A * | 4/1987 | Carr | B61L 29/04 | 49/192 |
| 4,681,479 | A * | 7/1987 | Wagner | E01F 9/669 | 404/6 |
| 4,711,608 | A * | 12/1987 | Ghusn | E01F 13/12 | 404/6 |
| 5,136,810 | A * | 8/1992 | DeWitt, III | E01F 13/06 | 49/141 |
| 6,004,103 | A * | 12/1999 | Fisher | F04B 49/02 | 417/415 |
| 6,126,402 | A * | 10/2000 | Fisher | F04B 49/035 | 417/42 |
| 9,677,314 | B2 * | 6/2017 | Houser | E05F 15/59 | |
| 2017/0370144 | A1 * | 12/2017 | Gall | E05F 15/53 | |
| 2020/0087874 | A1 * | 3/2020 | Hosokawa | E01F 13/06 | |

* cited by examiner

ENERGY-SAVING AND GAS-EFFICIENT PNEUMATIC BARRIER GATE DEVICE

CROSS REFERENCE TO RELATED APPLICATIONS

This application is a continuation-in-part of U.S. application Ser. No. 17/864,423 filed Jul. 14, 2022. The entirety of said application is incorporated herein by reference.

BACKGROUND OF THE INVENTION

Fields of the Invention

The present invention relates to an energy-saving and gas-efficient pneumatic barrier gate device, and more particularly, to a technique applied in a lifting equipment field.

Descriptions of Related Art

In the market, the majority of lifting barrier gates and warning devices employed in parking lots or maintenance facilities utilize a combination of electric motors and speed reduction mechanisms. During each lifting or lowering operation, the motor has to be activated repeatedly, leading to electrical power wastage. The electrical power demand is particularly prominent during the instantaneous motor start-up. In the generation that prioritizes green energy and environmental sustainability, achieving energy efficiency and reducing carbon emissions are paramount objectives. In addition to imposing financial burdens and economic losses, power wastage can also contribute to global environmental issues, such as rising temperatures.

As described in Taiwan Patent No. M558288, entitled by "Vehicle License Plate Recognition Device and Vehicle License Plate Recognition Barrier Gate" and Taiwan Patent No. M508743, entitled by "Parking Fee Inspection Barrier Gate Device", conventional techniques rely on the activation of motors and speed reduction mechanisms as described earlier. When implemented in large to medium parking lots, which experience hundreds of vehicle entries and exits daily, the barrier gates used to control vehicle access necessitate the activation of the motor hundreds of times for each lifting and lowering operation. This leads to significant power consumption. In the current energy crisis, electricity prices have reached exorbitant levels, making electricity costs the most significant burden for industry over time. Additionally, most barrier gates available in the market are equipped with electric motors and reduction gears. Therefore, in the event of a sudden power outage, the barrier gates are unable to operate in the lifting and lowering motion, leading to vehicles getting stranded inside the parking lot and causing inconvenience and disruption. Moreover, the practice of immediately restarting the motor after a power failure is highly likely to shorten the lifespan of the motor.

SUMMARY OF THE INVENTION

The primary objective of the present invention is to provide a barrier gate device that enhances energy efficiency and reduces carbon emissions during its operation, thereby addressing the inefficiencies associated with conventional barrier gates that rely on the combination of a motor and a reducer. For the conventional barrier gates, each lifting and lowering motion requires restarting of the motor and electrical power consumption for the reducer, leading to energy wastage and substantial electricity expenses. Additionally, during power outages, the motor and reducer are rendered inoperable, resulting in the inability to raise or lower the barrier gate. In order to achieve the aforementioned objectives and effects, the present invention provides an energy-saving and gas-efficient pneumatic barrier gate device, comprising: a machine that has a gas supply portion, an actuating portion and an electronic control portion, the gas supply portion being movably connected to an air compressor; a shaft assembly that is installed on the actuating portion of the machine; two switch components that are installed on the actuating portion and adjacent to both sides of the shaft assembly, respectively, the electronic control portion being electrically connected to the two switch components; a barrier component that is installed on one end of the shaft assembly, wherein the shaft assembly controls excitation of swinging motion of the barrier component, and the two switch components control cessation of the swinging motion of the barrier component; and a driving assembly that is installed on the other end of the shaft assembly. The gas supply portion is capable of supplying gas into the driving assembly for operation of the driving assembly, and the operation of the driving assembly controls pivoting motion of the shaft assembly and indirectly induces the swinging motion of the barrier component. The driving assembly includes a linkage rod and two bellow pumps. The linkage rod has a middle section pivoted to the shaft assembly. Each of the two bellow pumps has one end pivotally connected to a respective one of both ends of the linkage rod and the other end installed on a respective one of two supports on an outer surface of the gas supply portion.

DETAILED DESCRIPTION OF THE PREFERRED EMBODIMENT

Figure 1:
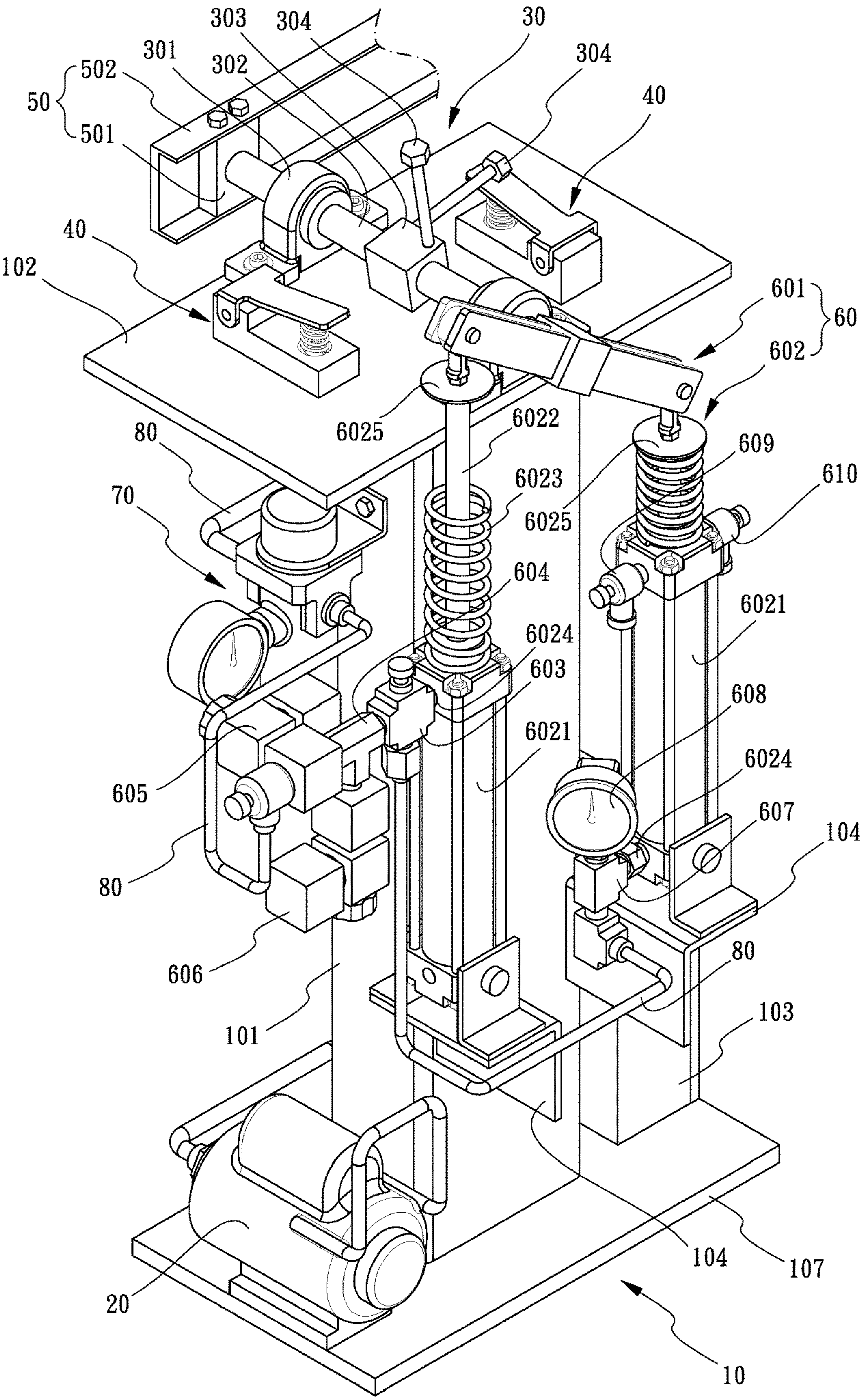
FIG. 1 is a perspective schematic view for illustration of the present invention.

Referring to FIGS. 1 to 7, the present invention discloses an energy-saving and gas-efficient pneumatic barrier gate device primarily designed for applications in parking lots, road maintenance facilities and the like and either fixedly installed on the ground or used as a portable device for versatile applications. The device includes a machine 10, which is approximately T-shaped when viewed from the right side in FIG. 1, and has a gas supply portion 101, an actuating portion 102 and an electronic control portion 103. The gas supply portion 101 is movably connected to an air compressor 20, which serves to fill the gas supply portion 101 with gas. The device further includes a shaft assembly 30 installed on the actuating portion 102 of the machine 10 and two switch components 40 installed on the actuating portion 102 and adjacent to both sides of the shaft assembly respectively. The electronic control portion 103 is electrically connected to the switch components 40. The alternate switching of the switch components 40 controls the shaft assembly 30 between the swinging mode and the stop/pause mode. The device also includes a barrier component 50 installed on one end of the shaft assembly 30. The shaft assembly 30 controls execution of the swiveling/swinging motion of the barrier component 50. The device also includes a driving assembly 60 for controlling the primary power operation and installed on the other end of the shaft assembly 30. The gas supply portion 101 supplies gas into the driving assembly 60 for operation of the driving assembly 60. The operation of the driving assembly 60 controls the shaft assembly 30 to pivot and thus indirectly induces the swinging motion of the barrier component 50. Specifically, the driving assembly 60 includes a linkage rod 601 and two bellow pumps 602. The middle section of the linkage rod 601 is pivoted to the shaft assembly 30. Each of the two bellow pumps 602 has one end pivotally connected to a respective one of both ends of the linkage rod 601 and the other end mounted on a respective one of two supports 104 on the outer surface of the gas supply portion 101. The supports 104 are in an inverted L-shape.

The gas injection into the gas supply portion 101 using the air compressor allows the filling of low-pressure gas. Once the gas filling is complete, the driving assembly 60 can initiate its operation. At this point, the two bellow pumps 602 in the driving assembly 60 initiate a cyclic motion of expansion and contraction by the introduction of gas when the electronic control portion 103 is powered and operational. The alternating expansion and contraction of the two bellow pumps 602, along with the association between the linkage rod 601 and shaft assembly 30, result in moving up and down alternately (seesaw-like motion) of the linkage rod 601 and the rotation of the shaft assembly 30, which in turn drives the swinging movement of the barrier component 50. In the meanwhile, the two switch components 40 are controlled to alternately turn on or turn off. Throughout this process, a small amount of electricity is required only when the air compressor 20 is inflating the gas supply portion 101 with gas. As long as the gas supply portion 101 is within the working pressure range, the air compressor 20 remains in an inactive state. Accordingly, utilizing gas for the control of the lifting and lowering of the barrier component 50 can save electricity and reduce electricity costs, thereby enabling energy efficiency and carbon reduction. Particularly, in the event of power outage, the electronic control portion 103 can continue to operate using a DC battery, ensuring the continuous lifting and lowering motion of the barrier components 50 without being affected by the power outage. Additionally, the air compressor 20 operates mainly at low pressure, making it suitable for small, medium, and large parking lots. For large parking lots, a gas supply portion with a greater volume can be provided. Moreover, the operation of the two bellow pumps 602 enables a more stable movement of the barrier components 50. This allows the use of heavier and longer barrier components 50 while maintaining a steady motion.

The gas supply portion 101 of the machine 10 is hollow inside and equipped with a gas outlet valve seat 105 and a gas inlet valve seat 106 on its outer surface. The gas outlet valve seat 105 and the gas inlet valve seat 106 are connected to the interior space of the gas supply portion 101. The gas inlet valve seat 106 is connected to the air compressor 20 for gas filling, while the gas outlet valve seat 105 outputs the gas stored in the gas supply portion 101 to the interior of the bellow pumps 602 in the driving assembly 60. The actuating component 102 is connected to the upper end of the gas supply portion 101. The gas supply portion 101 and the electronic control portion 103 are mounted on a pedestal portion 107, as shown in FIG. 2.

Figure 6:
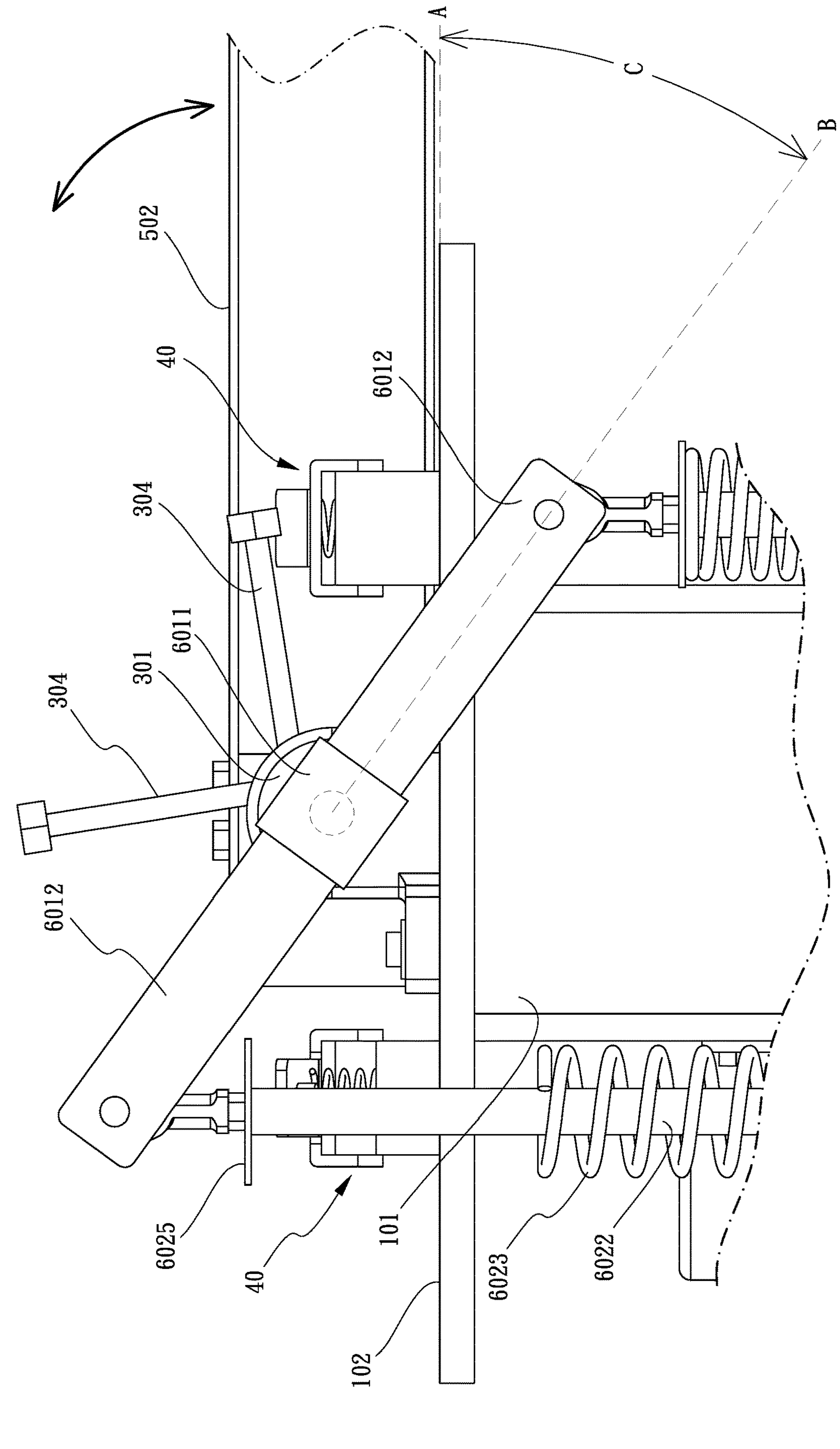
FIG. 6 is a partially enlarged schematic view of FIG. 5.
Figure 7:
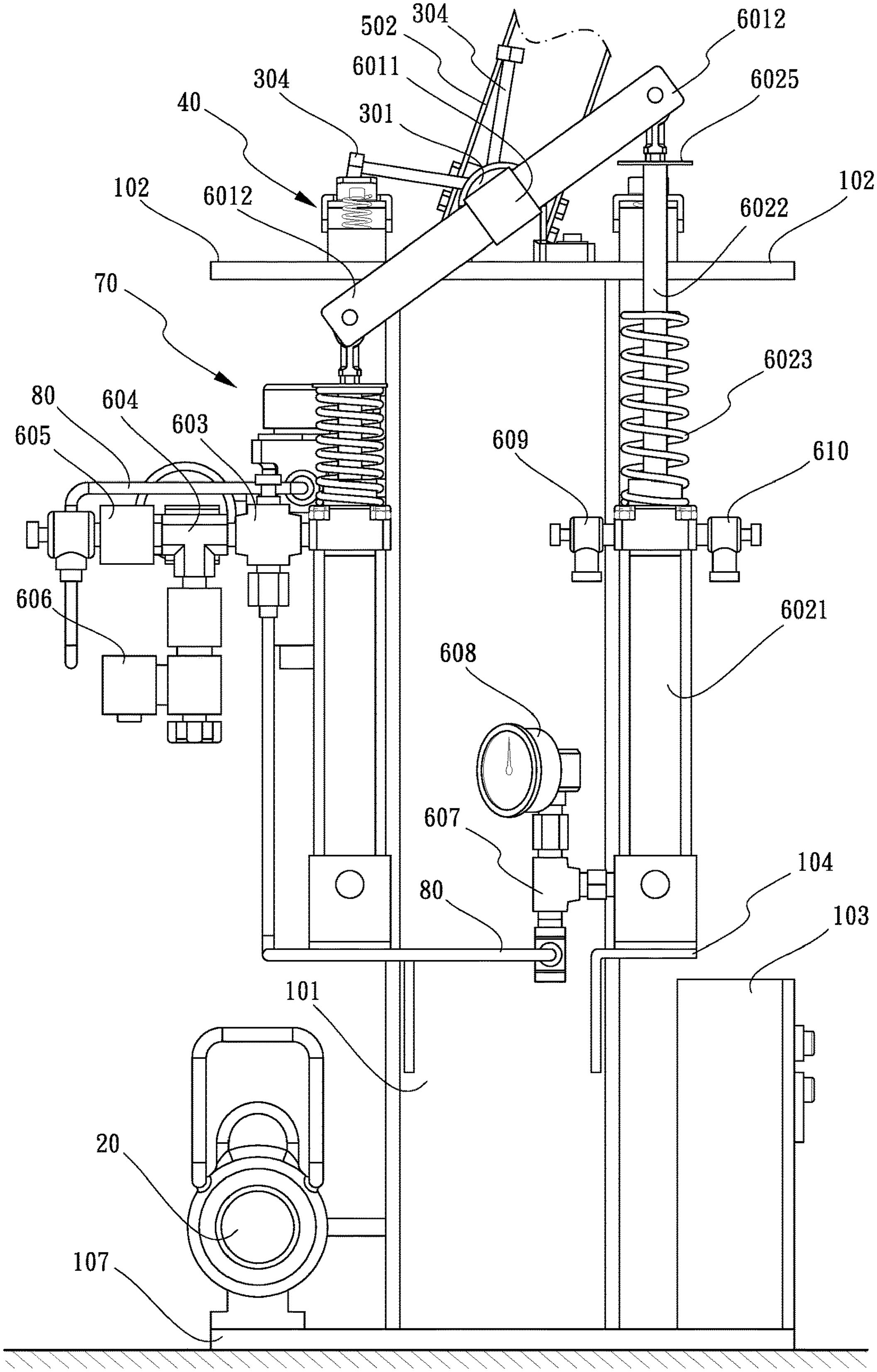
FIG. 7 is a schematic view for illustration of the motion of the rod member of the present invention.

Again referring to FIGS. 1 and 2, the shaft assembly 30 primarily serves as a bridge between the barrier component 50 and the driving assembly 60. The shaft assembly 30 further includes two shaft seats 301 in the form of fan-shaped sheet-like cuboid a spindle 302, and a switching seat 303. The two shaft seats 301 are mounted on the actuating component 102 and spaced from each other. Each of the shaft seats 301 is equipped with a bearing. The switching seat 303 is positioned between the two shaft seats 301. The spindle 302 passes through the two shaft seats 301 and the switching seat 303 and assembled with the respective bearings. This allows the spindle 302 to induce pivoting motion of the switching seat 303 between the two shaft seats 301. The spindle 302 has one end attached to the middle portion of the linkage rod 301 with an equal length from both ends of the linkage rod 601, and the other end connected to the barrier component 50. Further, two touch levers 304 protrude from the switching seat 303 and can be controlled to alternately press the two switch components 40 by the rotation of the switching seat 303. The expansion and contraction operation of the two bellow pumps 602 is associated with the spindle 302 through the linkage rod 601. The rotation of the spindle 302 controls the switching seat 303 to cause the touch levers 304 to alternately make contact with or release from the switch components 40, and indirectly controls the swinging motion of the barrier component 50 simultaneously. The linkage rod 601 includes a base portion 6011 and two rod portions 6012. The base portion 6011 is connected to one end of the spindle 302, and the two rod portions 6012 each have one end connected to a respective one of the both sides of the base portion 6011. The plane of the actuating component 102 defines a main axis A, while the base portion 6011 defines a secondary axis B. The angle between the secondary axis B and the main axis A forms an angle zone C, which has an angle ranging from 15 degrees to 45 degrees, as shown in FIGS. 1, 2 and 6.

Figure 2:
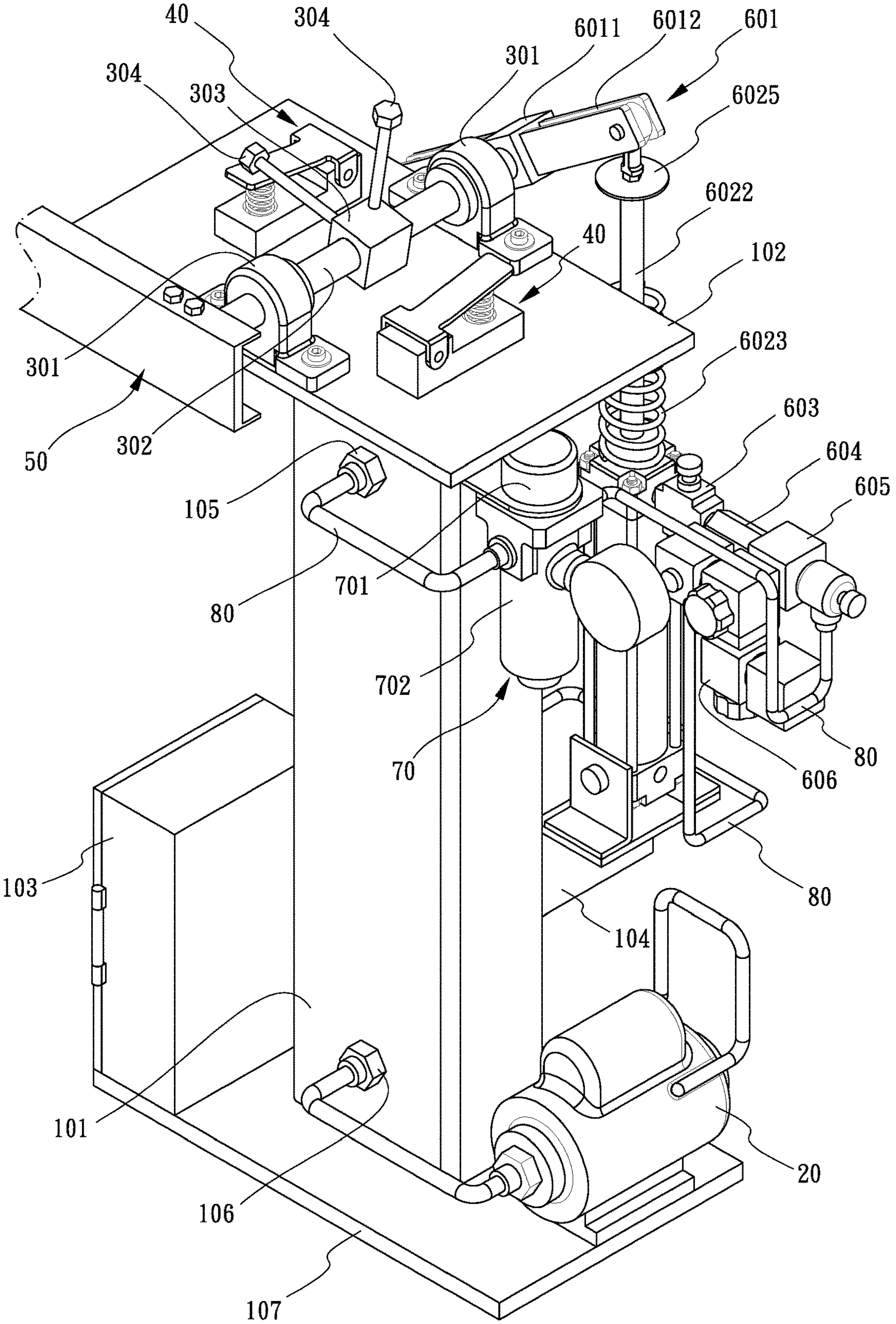
FIG. 2 is a perspective schematic view from another angle for illustration of the present invention.
Figure 3:
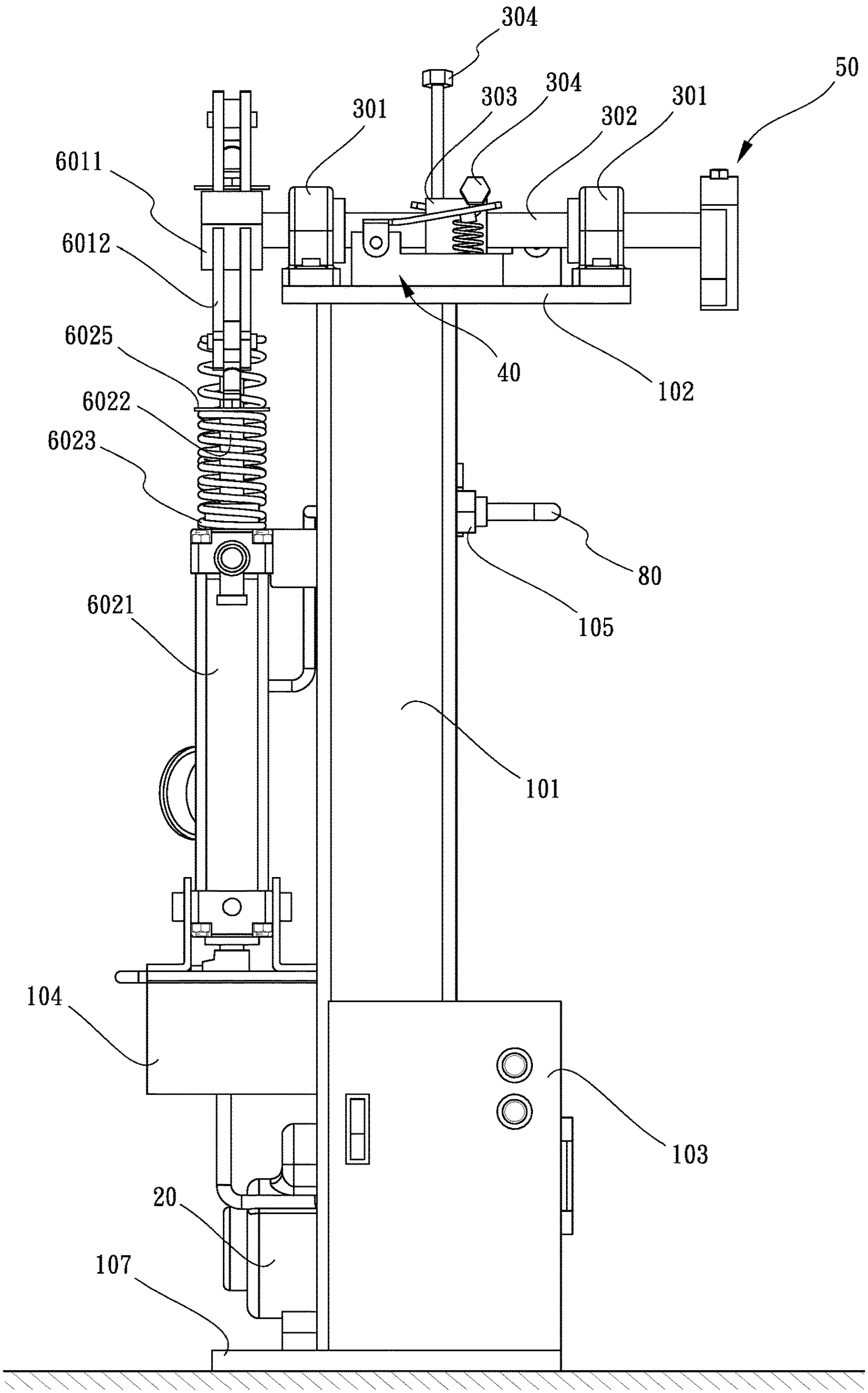
FIG. 3 is a plan schematic view for illustration of the present invention.
Figure 4:
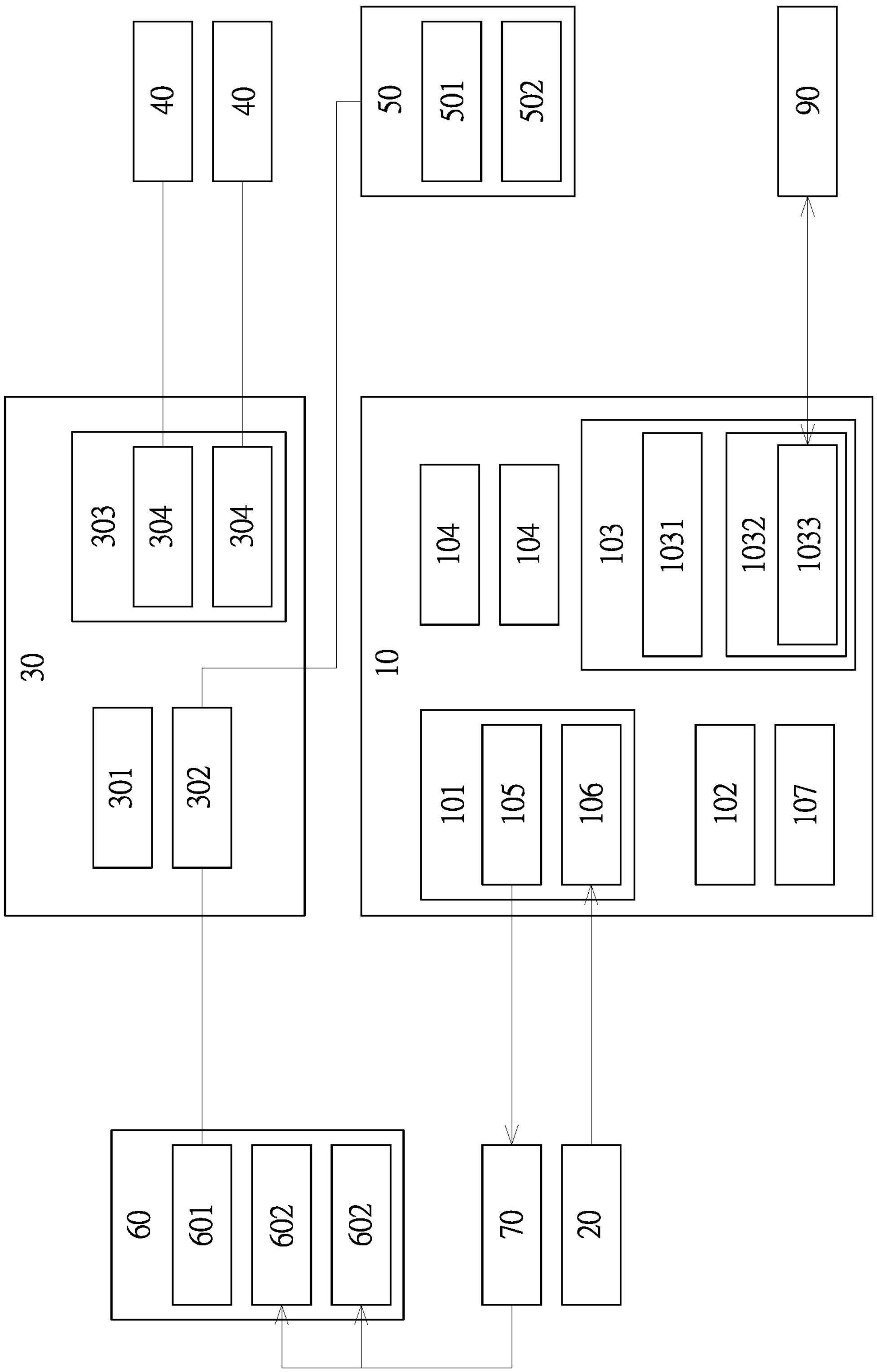
FIG. 4 is a block diagram for illustration of the present invention.
Figure 5:
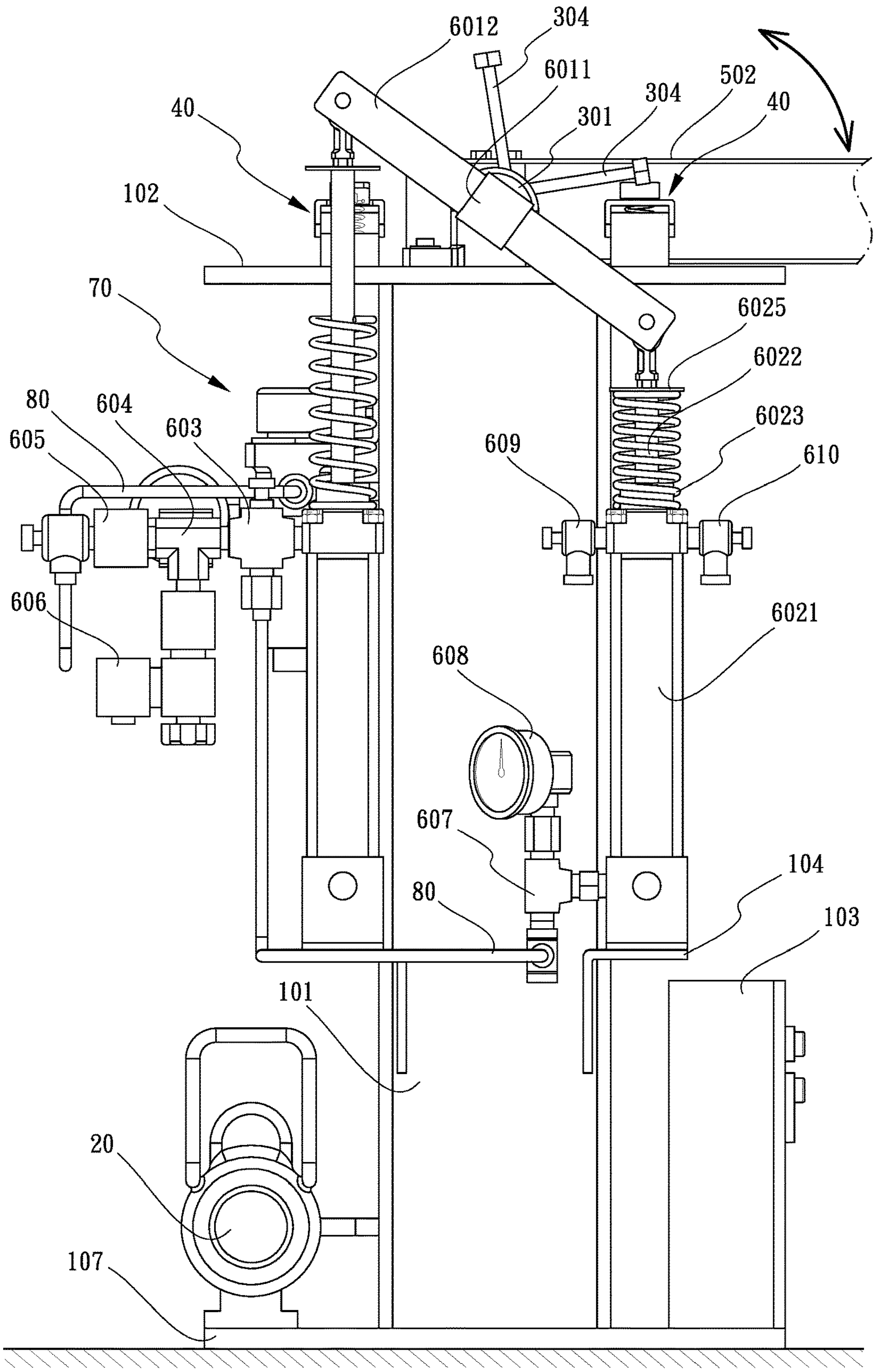
FIG. 5 is a plan schematic view for illustration of a rod member of the present invention positioned in a horizontal state.

As shown in FIGS. 1 and 2, the bellow pumps 602 in the driving assembly 60 each mainly include a cylinder 6021, a telescopic rod 6022, and a spring 6023. Each of the cylinders 6021 contains an internal space for storing gas supplied by the gas supply portion 101, and is provided with at least one gas vent 6024 on its outer surface to communicate with the internal space thereof. The telescopic rods 6022 each have one end inserted into its corresponding cylinder 6021 to enable piston motion and the other end pivotally connected to a respective one of the both ends of the linkage rod 601. The springs 6023 each are sleeved around a respective one of the telescopic rods 6022. Additionally, the end, pivoted to the linkage rod 601, of the telescopic rod 6022 is further provided with a stopper plate 6025 in a round shape. When either end of the linkage rod 601 swings downward, the corresponding stopper plate 6025 compresses the associated spring 6023. The elasticity of the spring 6023 provides a cushioning effect for slowing down the downward swinging of the linkage rod 601. To ensure more stable positioning of the barrier component 50 after swinging motion, the barrier component 50 further includes a pivot block 501 and a rod member 502. The pivot block 501 is securely attached to the spindle 302, while the rod member 502 has one end attached on the outer surface of the pivot block 501 and the other end extending in a perpendicular direction in relation to the shaft assembly 30. Additionally, one of the cylinders 6021 is equipped with a first pressure distribution valve 603 at the at least one gas vent 6024 to enable the swiveling motion of the rod member 502. One valve port of the first pressure distribution valve 603 is connected to one passage of a three-way connector 604. The other two passages of the three-way connector 604 are respectively connected to an electromagnetic valve assembly 605 and a pressure regulating valve assembly 606. The electromagnetic valve assembly 605 and the pressure regulating valve assembly 606 are electrically connected to the electronic control portion 103. The electromagnetic valve assembly 605 is connected to the gas outlet valve seat 105 of the gas supply portion 101. Additionally, an additional valve port of the first pressure distribution valve 603 is connected to the at least one gas vent 6024 of another cylinder 6021 that is further provided with a second pressure distribution valve 607. Further, the second pressure distribution valve 607 is connected to a pressure gauge 608.

After filling the space inside the gas supply portion 101 with gas from the air compressor 20, the gas is guided by the gas outlet valve seat 105 to the cylinders 6021 of the bellow pumps 602. By the piston motion of the telescopic rods 6022, the both ends of the linkage rods 601 alternately move up and down, thereby causing the synchronous rotation of the spindle 302. The rotation of the spindle 302 in turn controls the rotation of the pivot block 501 and the swinging motion of the rod member 502. Additionally, the springs 6023 securely locked around the respective telescopic rods 6022 provide elastic buffering force when the telescopic rods 6022 are compressed downward. To further reduce swaying of the rod member 502, a speed control valve 609 and a buffer adjustment valve 610 are additionally installed on the top outer surface of the cylinder 6021 equipped with the second pressure distribution valve 607. The speed control valve 609 can be employed to regulate the gas discharge flow rate from the internal space of the cylinder 6021. The buffer adjustment valve 610 is used to reduce the instantaneous compression speed of the telescopic rod 6022 during the discharge of gas from the cylinder 6021 by compression of the telescopic rod 6022, with reference to FIG. 3.

In order to prolong the service life of the bellow pumps 602, the gas entering the two bellow pumps 602 needs to be regulated and set to a specific working pressure. Referring to FIG. 2, a filter assembly 70 is installed on the machine 10. The filter assembly 70 is disposed between the gas outlet valve seat 105 of the gas supply portion 101 and the electromagnetic valve assembly 605 with a plurality of flexible hose 80 for connection among them. Specifically, the gas outlet valve seat 105 of the gas supply portion 101 is connected to the filter assembly 70 via the flexible hose 80. The filter assembly 70 includes a lubrication section 701 and an impurity filtering section 702. When the gas conveyed from the gas supply portion 101 reaches the filter assembly 70, it undergoes initial filtration by the impurity filtering section 702, which removes impurities from the gas. Subsequently, the gas is guided to the lubrication section 701 to remove impurities and enhance lubrication before entering the bellow pumps 602. Users can periodically check the oil level in the lubrication section 701 and replenish ail as necessary and replace the filter consumables (not shown in the figures) in the impurity filtering section 702. Additionally, the electromagnetic valve assembly 605 is connected to the lubrication section 701 of the filter assembly 70 via the flexible hose 80, allowing the lubricated gas to enter the cylinders 6021 through the electromagnetic valve assembly 605.

The electronic control portion 103 further includes a power supply 1031 and a main controller 1032. The power supply 1031 is electrically connected to the main controller 1032 and provides the necessary power for operation. The two switch components 40, the electromagnetic valve assembly 605, and the pressure regulating valve assembly 606 are electrically connected to the main controller 1032. Additionally, a wireless receiving unit 1033 is integrated into the main controller 1032, and a wireless remote controller 90 is connected to the wireless receiving unit 1033 for controlling the operation of the main controller 1032. This allows the user to remotely control the main controller 1032 using the wireless remote controller 90. The main controller 1032 can control the opening and closing of the valves in the electromagnetic valve assembly 605 and the pressure regulating valve assembly 606, as well as the alternate switching of the two switch components 40 using the two touch levers 304, effectively controlling the displacement of the rod component 502, please referring to FIG. 4.

What is claimed is:

1. An energy-saving and gas-efficient pneumatic barrier gate device, comprising:

a machine, having a gas supply portion, an actuating portion and an electronic control portion, wherein the gas supply portion is movably connected to an air compressor;

a shaft assembly, installed on the actuating portion of the machine;

two switch components, installed on the actuating portion and adjacent to both sides of the shaft assembly, respectively, wherein the electronic control portion is electrically connected to the two switch components;

a barrier component, installed on one end of the shaft assembly, wherein the shaft assembly controls execution of swinging motion of the barrier component, and the two switch components control cessation of the swinging motion of the barrier component; and a driving assembly, installed on the other end of the shaft assembly, wherein the gas supply portion is capable of supplying gas into the driving assembly for operation of the driving assembly, and the operation of the driving assembly controls pivoting motion of the shaft assembly and indirectly induces the swinging motion of the barrier component, and wherein the driving assembly includes a linkage rod having a middle segment pivoted to the shaft assembly, and two bellow pumps each having one end pivotally connected to a respective one of both ends of the linkage rod and the other end installed on a respective one of two supports on an outer surface of the gas supply portion;

wherein:

the shaft assembly includes two shaft seats, a spindle and a switching seat:

the two shaft seats are mounted on the actuating component and spaced from each other;

the switching seat is positioned between the two shaft seats;

the spindle passes through the two shaft seats and the switching seat, and has one end connected to the linkage rod and the other end connected to the barrier component;

the switching seat is provided with two touch levelers protruding therefrom, so that rotation of the switching seat controls the two touch levelers to alternately press the two switch components; and expansion and contraction motions of the two bellow pumps indirectly control the swinging motion of the barrier component through an association between the linkage rod and the spindle.

2. The energy-saving and gas-efficient pneumatic barrier gate device as claimed in claim 1, wherein:

the gas supply portion is hollow inside and equipped with a gas outlet valve seat and a gas inlet valve seat on the outer surface thereof, the gas outlet valve seat and the gas inlet valve seat are connected to an interior space of the gas supply portion;

the gas inlet valve seat is connected to the air compressor for gas filling:

the outlet valve seat is responsible for outputting gas stored in the gas supply portion into an interior of the bellow pumps in the driving assembly;

the actuating component is connected to an upper end of the gas supply portion; and the gas supply portion and the electronic control portion are mounted on a pedestal portion.

3. The energy-saving and gas-efficient pneumatic barrier gate device as claimed in claim 2, wherein the bellow pumps of the driving assembly each include a cylinder, a telescopic rod and a spring;

each of the cylinders contains an internal space for storing gas supplied by the gas supply portion, and is provided with at least one gas vent on an outer surface thereof to communicate with the internal space thereof;

each of the telescopic rods has one end inserted into a respective one of the cylinders to enable piston motion and the other end pivotally connected to a respective one of the both ends of the linkage rod;

each of the springs is sleeved around a respective one of the telescopic rods; and the end of each of the telescopic rods, pivotally connected to the linkage rod, is further provided with a stopper plate, so that when either end of the linkage rod swings downward, the respective stopper plate compresses the respective spring which has elasticity to provide a cushioning effect for slowing down the downward swinging of the linkage rod.

4. The energy-saving and gas-efficient pneumatic barrier gate device as claimed in claim 3, wherein:

one of the cylinders is equipped with a first pressure distribution valve at the at least one gas vent;

one valve port of the first pressure distribution valve is connected to one passage of a three-way connector, and other two passages of the three-way connector are respectively connected to an electromagnetic valve assembly and a pressure regulating valve assembly;

the electromagnetic valve assembly and the pressure regulating valve assembly are electrically connected to the electronic control portion;

the electromagnetic valve assembly is connected to the gas outlet valve seat of the gas supply portion;

an additional valve port of the first pressure distribution valve is connected to the at least one gas vent of the other one of the cylinders that is further provided with a second pressure distribution valve;

the second pressure distribution valve is connected to a pressure gauge; and gas within the gas supply portion is permitted to flow towards the electromagnetic valve assembly through the gas outlet valve seat and to in turn be directed into the cylinders by opening of the electromagnetic valve assembly, ensuring equal internal pressure across all the cylinders; and the pressure regulating valve assembly is responsible for pressure adjustment of the gas entering the cylinders.

5. The energy-saving and gas-efficient pneumatic barrier gate device as claimed in claim 4, further comprising a filter assembly installed on the machine, wherein:

the gas outlet valve seat of the gas supply portion is connected to the filter assembly via a flexible hose;

the filter assembly includes a lubrication section and an impurity filtering section;

after gas conveyed from the gas supply portion reaches the filter assembly, the gas is subjected to initial filtration for removal of impurities by the impurity filtering section and then directed to the lubrication section to remove impurities and enhance lubrication; and the electromagnetic valve assembly is connected to the lubrication section of the filter assembly via a plurality of flexible hoses, allowing the lubricated gas to enter the cylinders through the electromagnetic valve assembly.

6. The energy-saving and gas-efficient pneumatic barrier gate device as claimed in claim 4, wherein:

the electronic control portion includes a power supply and a main controller;

the power supply is electrically connected to the main controller and provides necessary power for operation;

the two switch components, the electromagnetic valve assembly, and the pressure regulating valve assembly are electrically connected to the main controller;

a wireless receiving unit is integrated into the main controller; and a wireless remote controller is connected to the wireless receiving unit for controlling operation of the main controller.

7. The energy-saving and gas-efficient pneumatic barrier gate device as claimed in claim 4, wherein:

a speed control valve and a buffer adjustment valve are installed on a top outer surface of the cylinder equipped with the second pressure distribution valve;

the speed control valve is responsible for regulation of gas discharge flow rate from an internal space of the cylinder; and the buffer adjustment valve is responsible for reduction of an instantaneous compression speed of the telescopic rod during gas discharge from the cylinder by compression of the telescopic rod.

8. The energy-saving and gas-efficient pneumatic barrier gate device as claimed in claim 1, wherein:

the linkage rod includes a base portion and two rod portions, the base portion connected to the one end of the spindle, and the two rod portions each having one end connected to a respective one of both sides of the base portion;

a plane of the actuating component defines a main axis, and the base portion defines a secondary axis; and an angle between the secondary axis and the main axis forms an angle zone, which has an angle ranging from 15 degrees to 45 degrees.

9. The energy-saving and gas-efficient pneumatic barrier gate device as claimed in claim 1, wherein the barrier component includes a pivot block and a rod member, the pivot block securely attached to the spindle, and the rod member having one end disposed on an outer surface of the pivot block and extending to the other end perpendicularly to the shaft assembly.

* * * * *